US012302876B2

(12) United States Patent
O'Neill et al.

(10) Patent No.: US 12,302,876 B2
(45) Date of Patent: May 20, 2025

(54) SEINE NET POSITION MEASUREMENT SYSTEM AND METHOD OF DETERMINING SEINE NET POSITION

(71) Applicant: Caledonia Nets LLC, Vashon, WA (US)

(72) Inventors: David O'Neill, Vashon, WA (US); Carles Castro Muniain, Valencia (ES); John Wescott Carroll, Peaks Island, ME (US); Cooper Van Vranken, Portland, ME (US)

(73) Assignee: CALEDONIA NETS LLC, Vashon, WA (US)

( * ) Notice: Subject to any disclaimer, the term of this patent is extended or adjusted under 35 U.S.C. 154(b) by 0 days.

(21) Appl. No.: 18/743,081

(22) Filed: Jun. 13, 2024

(65) Prior Publication Data

US 2024/0324563 A1    Oct. 3, 2024

Related U.S. Application Data

(63) Continuation of application No. PCT/US2023/079633, filed on Nov. 14, 2023.

(Continued)

(51) Int. Cl.
*A01K 73/12* (2006.01)
*A01K 75/00* (2006.01)
(Continued)

(52) U.S. Cl.
CPC .............. *A01K 73/12* (2013.01); *A01K 75/00* (2013.01); *G01B 21/18* (2013.01); *G01C 13/00* (2013.01)

(58) Field of Classification Search
CPC ........ A01K 73/12; A01K 73/00; A01K 73/02; A01K 73/025; A01K 74/00; A01K 75/00; A01K 71/00

(Continued)

(56) References Cited

U.S. PATENT DOCUMENTS 2,407,294 A * 9/1946 Shockley et al. ........ H03H 9/36
342/138
3,124,890 A * 3/1964 Puretic .................... A01K 73/06
43/6.5

(Continued)

FOREIGN PATENT DOCUMENTS

AU    2021101976 A4 *  6/2021
CN    105594669 A  *  5/2016

(Continued)

OTHER PUBLICATIONS

USPTO, International Search Report and Written Opinion of the International Searching Authority, Apr. 5, 2024, for PCT/US2023/079633.

*Primary Examiner* — Darren W Ark
(74) *Attorney, Agent, or Firm* — Invention To Patent Services; Alex Hobson

(57) ABSTRACT

A seine net position measurement system utilizes a plurality of sensor modules coupled to the seine net to determine the seine net position by recovering seine net position data, such as depth data, upon retraction of the seine net to the boat. The sensor modules may be configured proximal to the bottom of the net or the leadline. A depth profile of the net, as well as a rate of sinking of the net may be determined from the position data. The sensor modules have a sensor wireless signal transceiver that transmits a wireless signal to a wireless signal transceiver that sends the data to a computer for processing. The computer may be on the boat or part of a cloud computing system. This system is economical and enable a large number of sensor modules to be used to provide better accuracy of the net position.

24 Claims, 3 Drawing Sheets

Related U.S. Application Data

(60) Provisional application No. 63/425,666, filed on Nov. 15, 2022.

(51) Int. Cl.
*G01B 21/18* (2006.01)
*G01C 13/00* (2006.01)

(58) Field of Classification Search
USPC .......... 43/14, 7, 8, 9.1; 367/19–21; 702/166
See application file for complete search history.

(56) References Cited

U.S. PATENT DOCUMENTS

| | | | | |
|---|---|---|---|---|
| 3,444,510 A * | 5/1969 | Tyndale | G08C 23/02 | 367/134 |
| 4,229,809 A * | 10/1980 | Schwalbe | G01S 15/74 | 367/106 |
| 4,442,786 A * | 4/1984 | Conners | B63B 35/14 | 43/14 |
| 4,555,779 A * | 11/1985 | Roberts | G01S 15/874 | 367/19 |
| 4,763,432 A * | 8/1988 | Barclay | A01K 75/00 | 43/10 |
| 4,924,446 A * | 5/1990 | Cyr | G01S 5/22 | 367/130 |
| 5,684,755 A * | 11/1997 | Saunders | G01S 1/751 | 43/17 |
| 5,691,957 A * | 11/1997 | Spiesberger | G01V 1/305 | 367/5 |
| 5,696,733 A * | 12/1997 | Zinn | G01V 1/3835 | 367/19 |
| 6,138,397 A * | 10/2000 | Hammersland | A01K 73/04 | 43/9.6 |
| 7,366,056 B2 * | 4/2008 | Frivik | G01V 1/38 | 367/129 |
| 7,405,999 B2 * | 7/2008 | Skjold-Larsen | A01K 73/10 | 43/9.7 |
| 7,487,614 B1 * | 2/2009 | Walker | A01K 75/00 | 43/10 |
| 7,539,079 B2 * | 5/2009 | Hoogeveen | G01S 13/46 | 367/19 |
| 7,577,060 B2 * | 8/2009 | Toennessen | B63B 21/663 | 367/19 |
| 7,701,803 B2 * | 4/2010 | Welker | G01V 1/3826 | 367/19 |
| 8,020,336 B2 * | 9/2011 | Hu | A01K 73/02 | 43/9.7 |
| 8,060,314 B2 * | 11/2011 | Welker | G01V 1/3835 | 702/14 |
| 8,582,394 B2 * | 11/2013 | Sudow | G01V 1/3835 | 367/19 |
| 8,600,701 B2 * | 12/2013 | Hollis | G01N 33/0036 | 128/204.22 |
| 9,119,383 B2 * | 9/2015 | Skjold-Larsen | A01K 73/04 | |
| 9,151,833 B2 * | 10/2015 | Skjold-Larsen | A01K 73/04 | |
| 9,207,349 B2 * | 12/2015 | Cambois | G01V 13/00 | |
| 9,223,002 B2 * | 12/2015 | Crowell | G01S 19/14 | |
| 9,297,919 B2 * | 3/2016 | L'Her | G01S 11/14 | |
| 9,383,468 B2 * | 7/2016 | Poulton | G01V 1/3808 | |
| 9,663,192 B2 * | 5/2017 | Südow | G01V 3/083 | |
| 9,885,794 B2 * | 2/2018 | Fjellstad | G01V 1/3835 | |
| 10,136,126 B1 * | 11/2018 | Pratt | A01K 75/02 | |
| 10,520,631 B2 * | 12/2019 | Eick | G01S 19/14 | |
| 11,350,615 B2 * | 6/2022 | Yu | A01K 75/00 | |
| 2005/0180263 A1 * | 8/2005 | Lambert | G01S 5/26 | 367/128 |
| 2006/0083110 A1 * | 4/2006 | Tietjen | G01S 15/003 | 367/127 |
| 2006/0286931 A1 * | 12/2006 | Rhodes | H04B 13/02 | 455/40 |
| 2007/0089349 A1 * | 4/2007 | Skjold-Larsen | A01K 73/04 | 43/9.7 |
| 2007/0091719 A1 * | 4/2007 | Falkenberg | G01V 1/3835 | 367/19 |
| 2007/0159923 A1 * | 7/2007 | Huff | A01K 85/01 | 367/118 |
| 2008/0184541 A1 * | 8/2008 | Jang | F16B 45/023 | 24/598.7 |
| 2010/0088945 A1 * | 4/2010 | Gois | F16B 45/029 | 43/14 |
| 2010/0143038 A1 * | 6/2010 | Cobb | E02B 15/0814 | 405/63 |
| 2010/0180411 A1 * | 7/2010 | Jang | A01K 73/12 | 24/598.3 |
| 2010/0195435 A1 * | 8/2010 | Berland | G01V 1/201 | 367/20 |
| 2010/0229364 A1 * | 9/2010 | Gois, Sr. | F16B 45/029 | 29/428 |
| 2011/0032794 A1 * | 2/2011 | Rhodes | G01V 1/22 | 367/134 |
| 2011/0116343 A1 * | 5/2011 | Groenaas | G01V 1/3835 | 367/19 |
| 2012/0002507 A1 * | 1/2012 | Skjold-Larsen | A01K 73/04 | 367/127 |
| 2012/0250457 A1 * | 10/2012 | Rickert, Jr. | G01V 1/201 | 367/20 |
| 2013/0188451 A1 * | 7/2013 | Brizard | G01V 1/3835 | 367/19 |
| 2014/0160886 A1 * | 6/2014 | Muyzert | G01V 1/3817 | 367/19 |
| 2015/0156998 A1 * | 6/2015 | Terry | A01K 61/00 | 43/4.5 |
| 2015/0233713 A1 * | 8/2015 | Wolf | G01N 19/10 | 702/166 |
| 2015/0272094 A1 * | 10/2015 | Pearlman | A01K 73/045 | 43/9.1 |
| 2016/0017912 A1 * | 1/2016 | Jang | A01K 73/02 | 24/599.5 |
| 2017/0105397 A1 * | 4/2017 | Terry | A01K 73/02 | |
| 2021/0169058 A1 * | 6/2021 | Seo | A01K 75/005 | |
| 2023/0160693 A1 * | 5/2023 | Johnson | G01C 5/06 | 702/166 |
| 2023/0363365 A1 * | 11/2023 | Lippmann | A01K 75/04 | |
| 2024/0130336 A1 * | 4/2024 | Pham | A01K 63/00 | |

FOREIGN PATENT DOCUMENTS

| | | | | |
|---|---|---|---|---|
| CN | 114009408 A | * | 2/2022 | |
| CN | 216931498 U | * | 7/2022 | |
| DE | 1923854 A1 | * | 11/1970 | |
| EP | 1922921 A2 | * | 5/2008 | ............ A01K 73/04 |
| EP | 2174542 A2 | * | 4/2010 | ............ A01K 73/12 |
| EP | 2208417 A1 | * | 7/2010 | ............ A01K 73/04 |
| ES | 1284245 U | * | 12/2021 | |
| FR | 739213 A | * | 1/1933 | |
| FR | 1370668 A | * | 8/1964 | |
| FR | 2652233 A1 | * | 3/1991 | |
| GB | 2080209 A | * | 2/1982 | ............ A01K 73/12 |
| GB | 2235116 A | * | 2/1991 | ............ A01K 73/12 |
| JP | S6333671 B2 | * | 7/1988 | |
| JP | 2554789 B2 | * | 11/1996 | |
| JP | 2018148859 A | * | 9/2018 | |
| JP | 6923152 B2 | * | 8/2021 | |
| JP | 2021166547 A | * | 10/2021 | |
| KR | 19990037864 A | * | 5/1999 | |
| KR | 100311092 B1 | * | 11/2001 | |
| KR | 20080096337 A | * | 10/2008 | |
| KR | 100880958 B1 | * | 2/2009 | |
| KR | 20130093580 A | * | 8/2013 | |
| KR | 101835016 B1 | * | 3/2018 | |
| KR | 20200134878 A | * | 12/2020 | |
| SU | 710117 A1 | * | 10/1998 | |
| WO | WO-2005055709 A1 | * | 6/2005 | ............ A01K 73/02 |
| WO | WO-2005077162 A1 | * | 8/2005 | ............ A01K 73/04 |
| WO | WO-2006011807 A1 | * | 2/2006 | ........... A01K 73/025 |
| WO | WO-2008066879 A2 | * | 6/2008 | ............ A01K 75/00 |
| WO | WO-2010090526 A1 | * | 8/2010 | ............ A01K 73/04 |

(56) References Cited

FOREIGN PATENT DOCUMENTS

| WO | WO-2013041408 A1 | * | 3/2013 | ............ | A01K 73/02 |
| WO | WO-2013171683 A1 | * | 11/2013 | ............ | A01K 73/02 |
| WO | WO-2017017597 A1 | * | 2/2017 | | |

* cited by examiner

SEINE NET POSITION MEASUREMENT SYSTEM AND METHOD OF DETERMINING SEINE NET POSITION

CROSS REFERENCE TO RELATED APPLICATIONS

This application is a continuation of international application No. PCT/US2023079633, having an international filing date of Nov. 14, 2023, which claims the benefit of priority to U.S. provisional patent application No. 63/425,666, filed on Nov. 15, 2022; the entirety both are hereby incorporated by reference herein.

BACKGROUND OF THE INVENTION

Field of the Invention

The invention relates to a seine net position measurement system utilizing a plurality of sensor modules coupled to the seine net and a method of determining the seine net position, such as depth, underwater by recovering seine net position upon retraction of the seine net to the boat.

Background

Seine net fishing is an effective way to catch a large number of fish. The net is released into the water from a boat and the seine net has a floatline end that floats due to a plurality of floats coupled to the floatline end of the net by a float line. The bottom of the net, or the leadline end of the net sinks due to the leadline being heavier than water. The positioning of the seine net is critical to ensure effective fish capture. The rate of deployment of the seine net and in particular the rate of drop, or sinking of the lead line, and perimeter created by the net can make a significant difference in fish capture.

Acoustical-position sensors, sensors that transmit echo sounder images along with accompanying measured parameters acoustically, are employed to measure the position of the bottom of the net and the data is sent through the water to the boat directly from the acoustical sensors. Theses acoustical sensors are very expensive and therefore the number of sensors used to measure the position of the net is limited, such as to about six or less. Fishing nets and particularly seine nets can be very long, such as two kilometers or more; and therefore, an accurate representation of the bottom of the net is not fully realized with a limited number of sensors configured proximal to the bottom of the net.

SUMMARY OF THE INVENTION

The invention is directed to a seine net position measurement system utilizing a plurality of sensor modules coupled to the seine net and a method of determining the seine net position by recovering seine net position data upon retraction of the seine net to the boat. A plurality of sensor modules are coupled to the seine net assembly and positioned to enable effective determination of a position of the seine net when deployed. The sensor modules may measure depth and a plurality of sensor modules configured proximal to the bottom of the net, or leadline (within 10 m or preferably within 5 m of the bottom of the net or leadline), may provide a depth profile of the net, as well as a rate of sinking of the net. The sensor modules may be proximal to the bottom of the net or within 20% of the height of the seine net from the bottom of the seine net. The rate of sinking of various parts of the net as well as the perimeter surface formed by the net may be determined from the sensor module data. The sensor modules utilize wireless communication, such as short-range wireless communication, to transfer data to a computing system upon retrieval of the net. This dramatically reduces the cost of the sensor module compared to sensors communicating using underwater acoustics, or wired connections. The sensor modules may send sensor data upon retrieval of the net from the water. The computing system may receive depth data from each sensor module and use this data to produce a depth profile, or surface profile of the net. Graphs, animations, and analytics may be produced from this data and the graph may indicate non-uniformities or undesirable deployment characteristics that can be corrected by the addition or removal of weights and/or floats from the net or use of alternative materials to change the sinking behavior of the net. In addition, this information can be utilized to inform design of future nets.

An exemplary sensor module may include a depth sensor that monitors depth as a function of time. The depth may actually be derived from a pressure measured by the depth sensor. The sensor module may automatically start measuring depth when submerged a threshold depth of about 1.0 m or more, or about 1.5 m or more, for example. An exemplary sensor module may include a temperature sensor or other sensors that may be helpful for fishing. An exemplary sensor module may include one or more oceanographic sensors, a sensor configured to measure an oceanographic variable including, but not limited to, a temperature sensor, a conductivity sensor or salinity sensor, a pH sensor, a dissolved oxygen sensor, a turbidity sensor, a sound or ocean sound sensor, a nitrogen concentration sensor and a carbon sensor.

An exemplary sensor module is the Moana TD sensor available from ZebraTech LTD, Nelson, New Zealand.

An exemplary seine net position measurement system may utilize a plurality of sensor modules, such two or more, or more preferably about 10 or more, about 20 or more, about 30 or more, about 50 or more, about 10 to 50 and any other range between and including the values provide. The greater the number of sensor modules, the more accurate the determination of depth and/or surface profile of the net. The sensor modules may be positioned in an array over the seine net assembly to provide an effective determination of the net surface profile or depth profile as a function of time.

Sensor modules may be configured proximal to the float line (within 10 m and preferably within 5 m of the floatline) to determine if the top of the net is being pulled under water along the length of the net. Sensor modules may be configured at some depth or offset distance from the float line toward the lead line, such as about 35 m or more, or about 50 m or more, or even 100 m or more. In an exemplary embodiment, the sensor modules are configured proximal to the bottom of the seine net, or proximal to the leadline to provide data on the position of the bottom of the net along the length of the net. Sensor data of the position of the bottom of the net may indicate positions along the net where the net is not sinking as far or fast as other positions along the net. This data may be used to adjust the configuration of the net, such as by adding weights or changing net material to portions of the net to produce a more uniform depth of the bottom of the seine net.

Sensor modules may be configured a length offset distance along the seine net, such as about every 20 m or less, about every 30 m or less, about every 40 m or less, about every 50 m or less, or from about 20 m to 50 m and any other range between and including the length offset distances provide. A net, such as a seine, trawl, or gill net may have a length of about 50 m or more, about 100 m or more, about 250 m or more, about 500 m or more, about 1,000 m or more, or even 2,000 m or more. The longer the net, the greater the need to understand the position of the net or at least a depth profile. The longer the net, generally the more it costs for the boat to deploy.

An exemplary sensor module transmits sensor data via a wireless signal which is a signal that can be transmitted through air. A wireless signal as used herein is a signal that is transmitted when the sensor modules are pulled up from the water and the signal is transmitted through the air and is not an acoustic signal that is transmitted through the water. The wireless signal may be a short-range wireless signal that has a transmission range of about 150 m or less, about 100 m or less, about 50 m or less, about 25 m or less and any range between and including the values provided. A sensor module may include a short-range device (SRD), or a short-range sensor wireless signal transceiver, which is a radio-frequency transmitter device. An exemplary sensor module may include sensor wireless signal transceiver that is a short-range device, which is a low-power transmitters typically limited to 25-100 mW effective radiated power (ERP) or less, which enables transmission to a range of a few hundred meters. Short range devices typically do not require a license for their use, thereby reducing cost for the system and making them preferred. The depth measuring system is greatly simplified by the use of the short-range sensor wireless signal transceivers, as the cost and complexity of the sensor is greatly reduced and these types of sensors may be much more robust in harsh environments, including high pressure underwater environments. Short-range wireless technologies include Bluetooth, Wi-Fi, near-field communication (NFC), ultra-wideband (UWB) and IEEE 802.15.4. Short range wireless signal transmitters may utilize chips fabricated as RF CMOS integrated circuit (RF circuit).

The sensor modules send data via a sensor wireless signal transceiver, such as depth and temperature, to a wireless receiver, such as a wireless signal transceiver, that may be on the boat. This enables a short-range device of the sensor module to transmit sensor data when the net is pulled up from the water and is proximal to or on the boat. The wireless signal transceiver may transmit the sensor data to a computer that is on the boat or may transmit sensor data to a cloud-based computer for storage on a database and or analysis. The sensor data may be analyzed by software of the cloud-based computer and resulting analyses transmitted back to the boat, wherein the data may be reviewed on a display on the boat.

The computer system may use any suitable programming language to analyze the sensor data and produce graphs, charts and/or data analytics from the sensor data. Computer language may include, but is not limited to, Python, HTML and Javascript.

The exemplary seine net position measurement system may be utilized with fishing nets including seine nets as described herein or other nets, such as trawler nets, gillnets, and driftnets, each of which can be very long, such as 50 m or more, 500 m or more, 1,000 m or more, or even 2,000 m or more. As the nets become larger, it becomes more important to understand the depth profile to enable net adjustments for increasing the effectiveness of fish capture.

A computer, as used herein, may be a computing device that is configured on the boat, or a computing device that is part of a remote computer system, such as a cloud computing system, cloud computer, and may interface with a database that receives the data from the sensor modules.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Figure 1:
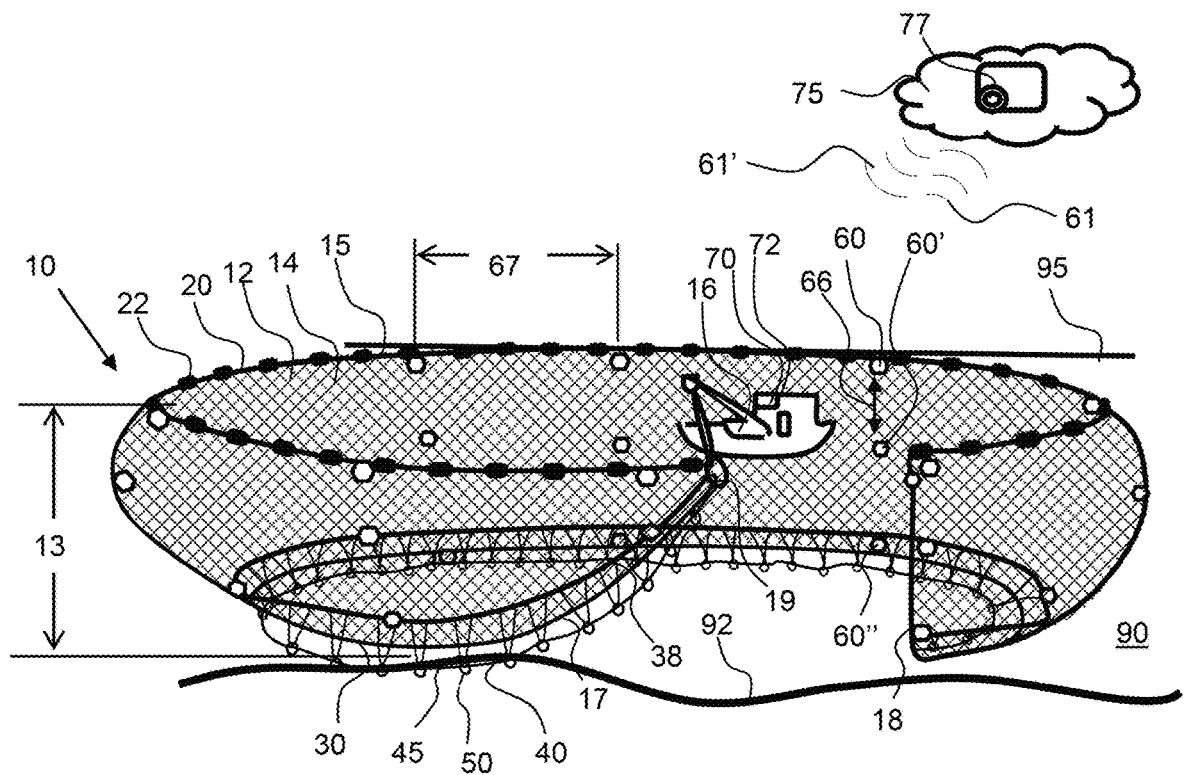
FIG. 1 shows a seine position measuring system incorporating a plurality of sensor modules coupled to the seine net.

Corresponding reference characters indicate corresponding parts throughout the several views of the figures. The figures represent an illustration of some of the embodiments of the present invention and are not to be construed as limiting the scope of the invention in any manner. Some of the figures may not show all of the features and components of the invention for ease of illustration, but it is to be understood that where possible, features and components from one figure may be included in the other figures. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Figure 2:
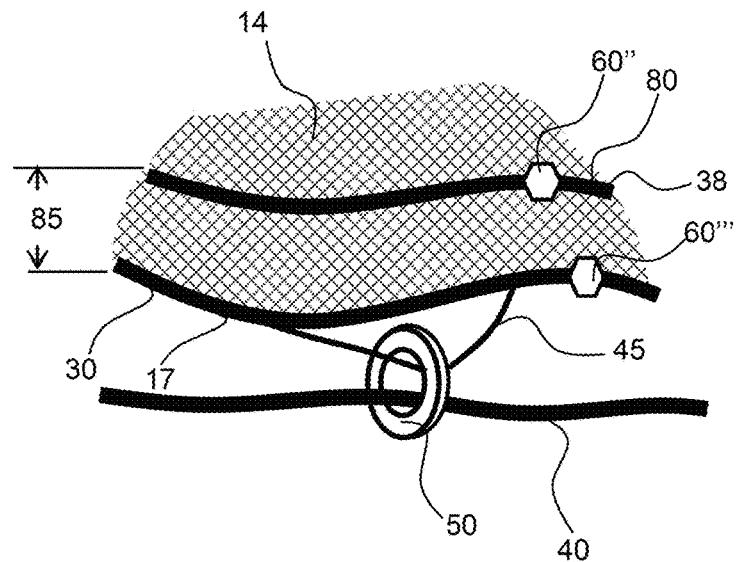
FIG. 2 shows a purseline and purse ring portion of a seine net with the purse ring coupled to a ribline by the bridles, wherein the ribline is coupled to the seine net an offset distance up from the leadline.

Referring now to FIGS. 1 and 2, a seine net positioning measuring system 10 incorporates a plurality of sensor modules 60 coupled to the seine net assembly 12. An exemplary seine net assembly is released into the water and then retracted by a boat 16. A deployed end 18 of the seine net 14 is deployed from the boat 16 and a retained end 19 is moved as the seine net is released to form an enclosed area as the retained end is brought back toward the deployed end. The floatline end 15 of the seine net 14 is floated on or proximal to the surface 95 of the water by floats 22 coupled to a floatline 20. The bottom or leadline end 17 of the seine net 14 is sunk into the water by a leadline 30 that sinks and pulls the seine net down through the water. As shown in FIG. 2, the purse rings 50 are coupled to a coupling line 38, a ribline 80 in this embodiment, that is configured an offset distance 85 up from the leadline 30. This type of attachment of the purse rings is used when the seine net is used in shallower waters where there is a risk that the leadline 30 and leadline end 17 of the seine net 14 will contact the floor 92 of the body of water 90. The ribline is preferably a buoyant line and therefore the ribline pulls the seine net up from the leadline. However, a purseline 40 may be configured to extend through purse rings 50 and may be coupled to a coupling line 38 or leadline by a bridle 45. This type of purse ring 50 coupling to the leadline 30 may be used when the depth or height 13 of the seine net 14 from the floatline end 15 to the leadline end 17 is less than the depth of the body of water 90 and there is no risk of the leadline end 17 of the seine net contacting the floor 92 of the body of water.

The exemplary sensor modules 60, 60', 60" may be coupled to any portion of the seine net assembly 12, including the seine net 14, the float line 20, leadline 30, coupling line, purse line 40, bridle 45 or even to the purse ring 50. As shown in FIG. 1, the sensor modules are configured in a grid, with the modules configured vertically along the height of the seine net with sensor module 60 proximal to the float line or coupled to the float line, sensor module 60' located between the float line and the leadline, and sensor module 60" configured more proximal to the leadline', or proximal to the bottom of the seine net when extending vertically in the body of water 90. These sensor modules may be configured an offset height distance 66 from each other along the height 13 of the seine net, or an offset height distance from the float line. Also, sensor modules may be configured an offset length distance 67, along the length of the seine net. As shown in FIG. 2, a sensor module 60" is coupled to the ribline 80 and a second sensor module 60''' is coupled to the leadline 30.

The sensor module data may be transmitted to the boat by the sensor wireless signal transceivers of each sensor module. A wireless signal transceiver 72 may be configured on the boat 16 to receive the depth data after the sensor modules are pulled up from the water. The wireless signal transceiver may transfer the depth data to a computer on the boat, or may send the depth data to a cloud computer 75 by a wireless signal 61. Subsequently the cloud computer may have a wireless signal transceiver 77 that receives the sensor module data and may further analyze the data using a computer program and send the analyzed data back to the boat 16 via a wireless signal 61'. As described herein however, the computer 70 on the boat may perform analysis of the sensor module data directly.

Figure 3:
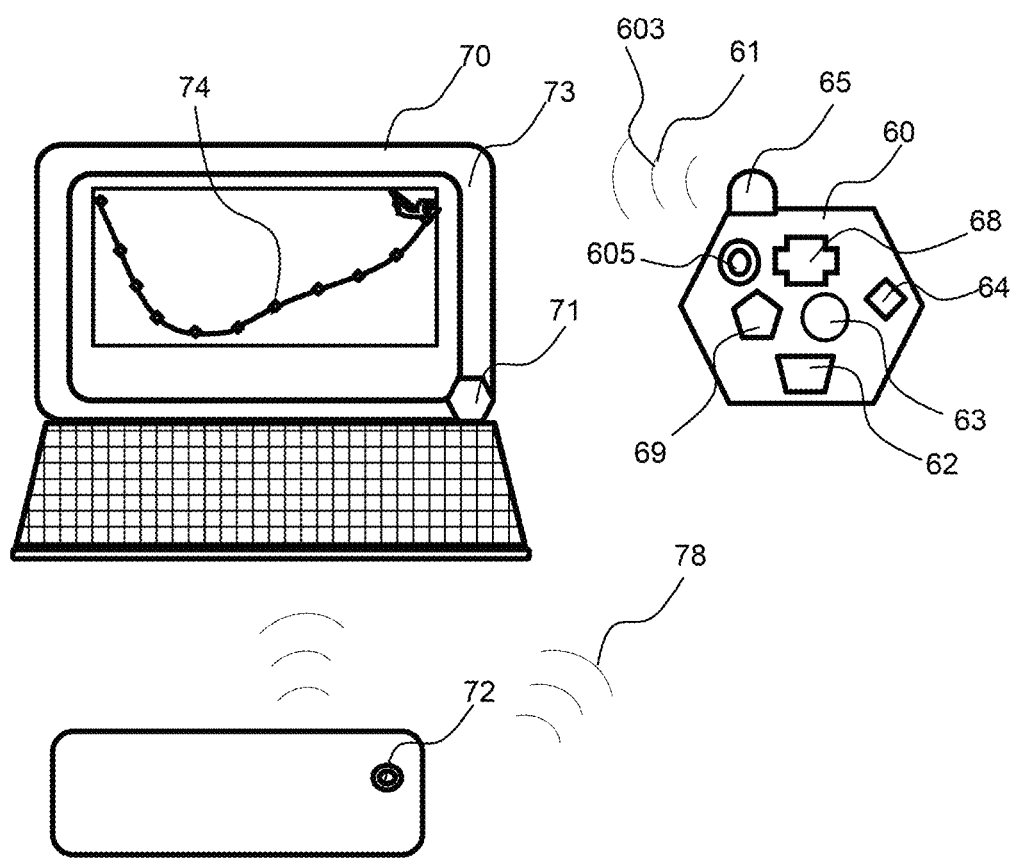
FIG. 3 shows a sensor module and a computer configured to receive sensor data wirelessly from the sensor module upon retrieval of the seine net onto the boat.

As shown in FIG. 3, an exemplary sensor module 60 is within proximity to a wireless signal transceiver 72 and is transmitting sensor data 603 via a wireless signal 61 to the wireless signal transceiver 72 by the sensor wireless signal transceiver 65, which may be a short-range device, or a short-range sensor wireless signal transceiver, as described herein. The sensor wireless signal transceiver 65 may be configured to only transmit a wireless signal and not be configured to receive a signal. The sensor wireless signal transceiver 65 may transmit data to the wireless signal transceiver 72 and then receive a confirmation signal 78 from the wireless signal transceiver that confirms receipt of the depth data, and the wireless signal transceiver may send a signal to direct the sensor module to clear the data stored in the digital data memory device, which may be the confirmation signal. The wireless signal transceiver 72 may be configured with the computer 70 or may be configured on the boat proximal to where the seine net is retrieved to enable transmission of the wireless signals via a short-range wireless signal as described herein. The wireless signal transceiver 72 may be within a short-range wireless signal range of the plurality of sensor modules, or within about 200 m or less, about 150 m or less, or 100 m or less. The wireless signal transceiver 72 may be configured remotely however thereby requiring longer range signal transmission.

The exemplary sensor module 60 has a depth sensor 62, a temperature sensor 68, a Global Positioning Sensor 64 (GPS), a clock 63, an oceanographic sensor 605 selected from the group consisting of a conductivity (salinity) sensor, a pH sensor, a dissolved oxygen sensor, a turbidity sensor, a sound or ocean sound sensor, a nitrogen concentration sensor and a carbon sensor, and a digital data memory device 69 to store the sensor module data. The clock 63 enables determination of a rate of depth change for each of the sensor modules and this data can be used to determine where the net may require more weight to increase the rate of sinking. A GPS may determine depth and position of the sensor.

The computer 70 is creating a graph 74 of a depth data, or depth profile of the seine net with data from each sensor module configured along the bottom of the net shown as a symbol along the depth profile line. The computer 70 has a processor 71, such as a microprocessor, for running a computer program 73 that determines shape profiles from the sensor data.

Figure 4:
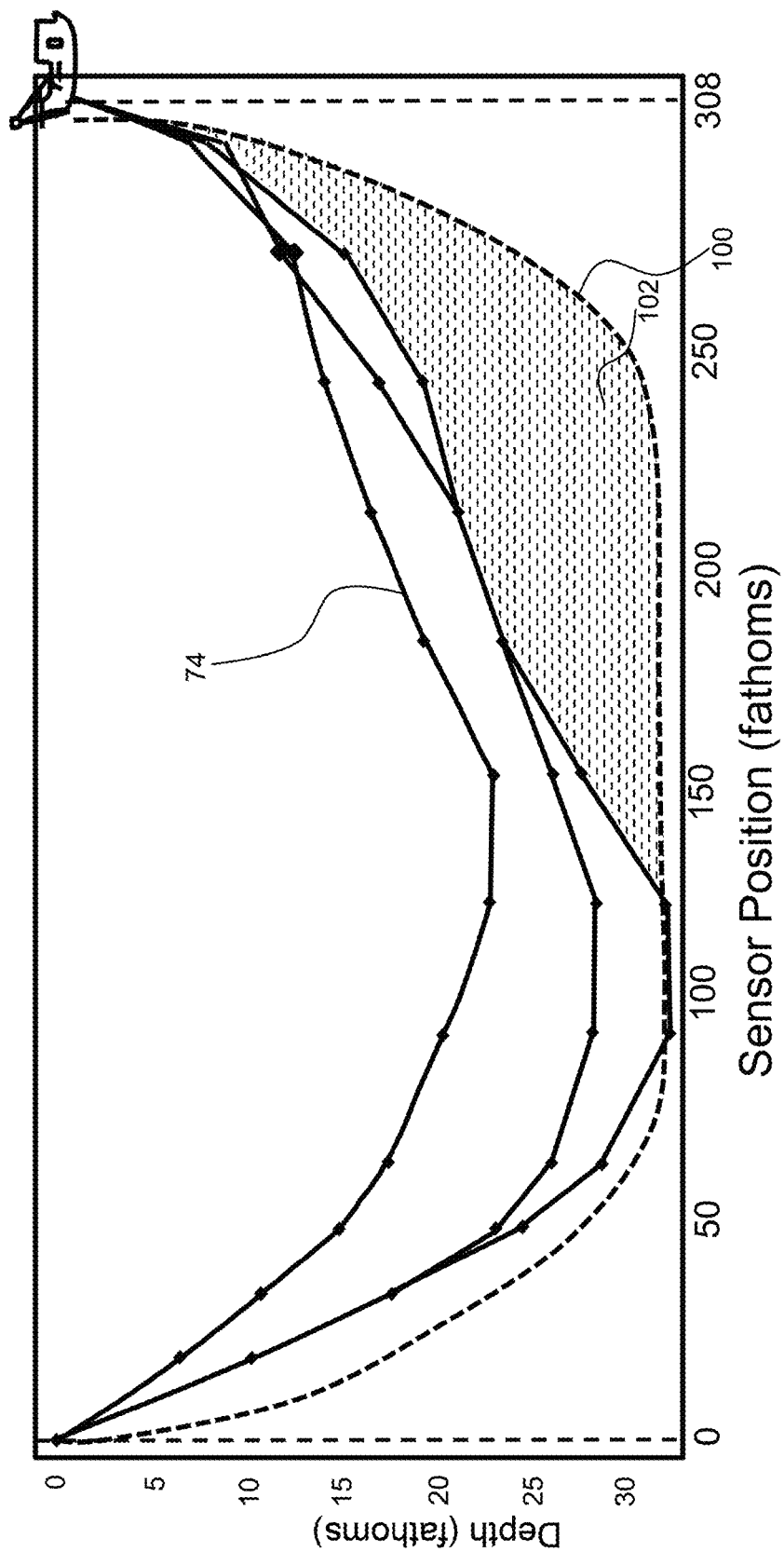
FIG. 4 shows a graph of the depth of the sensor modules, configured proximal to the leadline, for three deployments of a seine net.

FIG. 4 shows a graph 74 of the depth data of the sensor modules, configured proximal to the leadline, for three deployments of a seine net. The depth profile is similar for each deployment of the seine net and the net end closer to the boat is not sinking as desired, leaving a larger area where fish will not be caught. A desired depth profile 100, or ideal depth profile, is shown in a dashed line that drops quickly from the boat to a maximum depth that is substantially consistent along the length of the net until quickly extending up. The non-captured area 102, or area that could be covered by the net for capturing fish is shown between the desired depth profile and the depth profiled of the lowest deployment of the net from the boat. Note that this area is a volume of water not being captured by the seine net.

It will be apparent to those skilled in the art that various modifications, combinations, and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A seine net position measurement system comprising:
   a seine net extending a height from a floatline end thereof to a leadline end thereof and having a length from a coupled end thereof, coupled to a boat, and a deployed end thereof;
   a floatline coupled to the seine net;
   a plurality of floats coupled to the floatline;
   wherein the floatline is configured to float the floatline end of the seine net in a body of water;
   a leadline coupled to the seine net and configured to sink in a body of water;
   wherein the leadline is configured to sink the leadline end of the seine net in a body of water;
   a purseline coupled to the seine net and extending proximal to the leadline;
   wherein said seine net extends between the floatline and the leadline;
   a plurality of sensor modules coupled to the seine net comprising:
      a depth sensor configured to measure depth data;
      a sensor wireless signal transceiver that sends a wireless signal when above a surface of said body of water; and
      a digital data memory device;
   wherein each of the plurality of sensor modules is coupled to the seine net;
   a computer having a processor configured to run a computer program; and
   a wireless signal transceiver configured to receive the wireless signal with the depth data from each of the plurality of sensor modules and wherein the wireless signal transceiver is configured to provide said depth data to the computer.

2. The seine net position measurement system of claim 1, wherein the plurality sensor modules include at least four sensor modules.

3. The seine net position measurement system of claim 1, wherein the sensor wireless signal transceiver consists of a short-range wireless signal transceiver having a signal transmission range of 150 m or less.

4. The seine net position measurement system of claim 1, wherein the plurality of sensor modules are within 20% of the height of the seine net from the leadline.

5. The seine net position measurement system of claim 4, wherein the computer is configured to produce a graph of a depth profile of the seine net.

6. The seine net position measurement system of claim 4, wherein the computer is configured to produce a graph of a rate of sinking of the seine net as a function of time.

7. The seine net position measurement system of claim 1, wherein the plurality sensor modules are arranged in a grid along the length and the height of the seine net.

8. The seine net position measurement system of claim 1, wherein at least one of the plurality sensor modules includes a temperature sensor.

9. The seine net position measurement system of claim 1, wherein at least one of the plurality sensor modules includes an oceanographic sensor selected from the group consisting of a conductivity sensor, a pH sensor, a dissolved oxygen sensor, a turbidity sensor, a sound or ocean sound sensor, a nitrogen concentration sensor and a carbon sensor.

10. The seine net position measurement system of claim 1, wherein the wireless signal transceiver is configured to confirm receipt of the depth data from the plurality of sensor wireless signal transceivers by sending a confirmation wireless signal to the plurality of sensor modules.

11. The seine net position measurement system of claim 10, wherein each of the plurality of sensor modules are configured to clear the respective depth data stored in the digital data memory device after receiving the confirmation wireless signal from the wireless signal transceiver.

12. The seine net position measurement system of claim 1, wherein the wireless signal transceiver is configured to send the depth data to a cloud computer and subsequently the cloud computer transfers the depth data to the computer.

13. A method of measuring a seine net position comprising:
   a) providing a seine net position measuring system as described in claim 1:
   b) placing the seine net in the water with the purseline coupled to a boat;
   c) allowing the leadline end of the seine net to sink in said body of water, wherein the plurality of floats retain the floatline proximal to a surface of said body of water;
   wherein the depth data is stored as a function of time on said digital data memory device;
   d) retracting the seine net to the marine vessel; and
   e) sending the depth data from the plurality of sensor modules to the wireless signal transceiver when the plurality of sensor modules are above said surface of the body of water.

14. The method of measuring a seine net position of claim 13, wherein the plurality sensor modules include at least 4 sensor modules.

15. The method of measuring a seine net position of claim 13, wherein the sensor wireless signal transceiver consists of a short-range wireless signal transceiver having a signal transmission range of 150 m or less.

16. The method of measuring a seine net position of claim 13, wherein the plurality of sensor modules are within 20% of the height of the seine net from the leadline.

17. The method of measuring a seine net position of claim 16, further comprising transferring the depth data from the wireless signal transceiver to the computer and wherein the computing device produces a graph of a depth profile of the seine net.

18. The method of measuring a seine net position of claim 16, further comprising transferring the depth data from the wireless signal transceiver to the computer and wherein computer produces a rate of sinking of the seine net as a function of time.

19. The method of measuring a seine net position of claim 16, further comprising transferring the depth data from the wireless signal transceiver to a cloud computer and wherein the computer interfaces with said cloud computer to receive depth data.

20. The method of measuring a seine net position of claim 13, wherein the plurality sensor modules are arranged in a grid along the length and the height of the seine net.

21. The method of measuring a seine net position of claim 13, wherein at least one of the plurality sensor modules includes a temperature sensor.

22. The method of measuring a seine net position of claim 13, wherein at least one of the plurality sensor modules includes an oceanographic sensor selected from the group consisting of a conductivity sensor, a pH sensor, a dissolved oxygen sensor, a turbidity sensor, a sound or ocean sound sensor, a nitrogen concentration sensor and a carbon sensor.

23. The method of measuring a seine net position of claim 13, wherein the wireless signal transceiver confirms receipt of the depth data from each of the sensor wireless signal transceivers by sending a confirmation wireless signal to said plurality of sensor modules.

24. The method of measuring a seine net position of claim 23, wherein each of the plurality of sensor modules clear the respective depth data stored in the digital data memory device after receiving the confirmation wireless signal from the wireless signal transceiver.

\* \* \* \* \*